United States Patent [19]

Hoefs et al.

[11] Patent Number: 4,737,530
[45] Date of Patent: Apr. 12, 1988

[54] WATER-REDUCIBLE COATING COMPOSITION BASED ON AN EPOXY RESIN

[75] Inventors: Cornelis A. M. Hoefs, Elst; Pieter Oosterhoff, Arnhem, both of Netherlands

[73] Assignee: Akzo N.V., New York, N.Y.

[21] Appl. No.: 43,519

[22] Filed: Apr. 28, 1987

[30] Foreign Application Priority Data

Apr. 29, 1986 [NL] Netherlands ........................ 8601099

[51] Int. Cl.$^4$ .......................... C08L 63/00; C09D 3/58
[52] U.S. Cl. ..................................... 523/414; 528/121; 528/123; 252/182
[58] Field of Search ................ 528/121, 123; 523/414; 252/182

[56] References Cited

U.S. PATENT DOCUMENTS

| | | | |
|---|---|---|---|
| 2,811,495 | 10/1957 | Witcoff et al. | 523/414 |
| 2,899,397 | 8/1959 | Aelony et al. | 523/414 |
| 3,926,886 | 12/1975 | Kelley et al. | 523/414 |
| 4,495,317 | 1/1985 | Albers | 523/414 |
| 4,598,108 | 7/1986 | Hoefs | 523/414 X |

*Primary Examiner*—Earl Nielsen
*Attorney, Agent, or Firm*—Jeffrey S. Boone; Francis W. Young; Louis A. Morris

[57] ABSTRACT

The invention provides a water-reducible coating composition comprising an epoxy resin, an amino group-containing curing agent for the epoxy resin and a formic acid ester having a solubility of at least 0.2 g in 100 g of water of a temperature of 20° C., with the exception of tert. butyl formiate.

11 Claims, No Drawings

WATER-REDUCIBLE COATING COMPOSITION BASED ON AN EPOXY RESIN

The invention relates to a water-reducible coating composition based on an epoxy resin, an amino group-containing curing agent for it and a carboxylic ester. The important advantage to water-reducible coating compositions is that upon their application no organic solvent, or upon the use of a co-solvent only little organic solvent, will be released into the atmosphere. Moreover, the use of water will diminish physiological drawbacks and fire and explosion hazards. European Patent Application No. 171 102 describes such a composition, in which an organic compound is present in at least 2 tautomeric forms, in one of which a labile hydrogen atom is linked to a carbon atom and which compound contains at least one carbonyloxy group or sulphonyl group. As examples of such compounds may be mentioned carboxylic esters, such as the methyl ester or ethyl ester of nitroacetic acid, cyanoacetic acid, monochloroacetic acid, 3-chloropropionic acid, trifluoroacetoacetic acid and acetylacetic acid. The compounds envisaged here are used for emulsifying the epoxy resin and the curing agent in the aqueous phase. The composition is curable at ambient temperature and can advantageously be applied as coating composition for the protection of metal surfaces of ships, aircraft, vehicles and bridges. The coatings thus obtained display a very high resistance to, for instance, organic solvents and water.

Surprisingly, Applicant has found that in the composition of the present invention very special carboxylic esters which do not occur in 2 tautomeric forms will nevertheless have an effective emulsifying action on the epoxy resin and the curing agent and provide coatings displaying equally good properties.

The coating composition according to the invention is characterized in that the ester is a formic acid ester having a solubility of at least 0,2 g in 100 g of water of a temperature of 20° C., with the exception of tert. butyl formate.

The term epoxy resin as used in the present specification refers to a compound having at least 1, but preferably 2 epoxy groups per molecule. As examples of suitable epoxy resin which, as such, may be solid or liquid may be mentioned the mono-, di- or polyglycidyl ethers of (cyclo) aliphatic or aromatic hydroxyl compounds, such as allyl alcohol, butanol, cyclohexanol, phenol, butyl phenol, decanol, ethylene glycol, glycerol, cyclohexane diol, mononuclear di- or trifunctional phenols, bisphenols such as Bisphenol-A and Bisphenol-F, and multinuclear phenols; polyglycidyl ethers of phenol-formaldehyde novolac; polymers of ethylenically unsaturated compounds with epoxy groups such as glycidyl (meth)acrylate, N-glycidyl (meth)acrylamide and/or allyl glycidyl ether, and optionally of one or more other copolymerizable, ethylenically unsaturated monomers; cycloaliphatic epoxy compounds such as epoxidized and, optionally, successively hydrogenated styrene or divinyl benzene; glycidyl esters of fatty acids containing, for instance, 6–24 carbon atoms; glycidyl (meth)acrylate; isocyanurate group-containing epoxy compounds; an epoxidized polyalkadiene such as epoxidized polybutadiene; hydantoin epoxy resins; epoxy resins obtained by epoxidizing aliphatic and/or cycloaliphatic alkenes, such as dipentene dioxide, dicyclopentadiene dioxide and vinylcyclohexene dioxide and glycidyl groups-containing resins such as polyesters or polyurethanes which contain one or more glycidyl groups per molecule, or mixtures of the above-envisaged epoxy resins. Generally, the above-envisaged monoepoxy compounds are used along with the di- or polyepoxy compound(s), but there is no absolute need for that. The epoxy resins are known to a man skilled in the art and need not be further described here.

It is preferred that the epoxy resin used should be a compound of the following general formula:

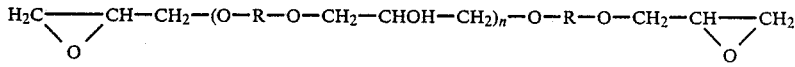

wherein R represents an aliphatic, cycloaliphatic or aromatic group and n is a number between 0 and 150, preferably between 0 and 60. As examples of such epoxy resins may be mentioned the glycidyl ethers of ethylene glycol, diethylene glycol, triethylene glycol, 1,2-propane diol, 1,3-propane diol, 1,4-butane diol, 1,5-pentane diol, bis-(4-hydroxycyclohexyl)-2,2-propane, 4,4'-dihydroxybenzophenone, cyclohexane diol, bis-(4-hydroxyphenyl)methane, bis-(4-hydroxyphenyl)-1,1-ethane, bis-(4-hydroxyphenyl)-1,1-isobutane and 1,5-dihydroxy naphthalene. Optionally, use may be made of polyglycidyl ethers of compounds such as glycerol, trimethylol ethane, trimethylol propane or 1,2,6-hexane triol. More particularly, use is made of a diglycidyl ether based on bis-(4-hydroxyphenyl)-2,2-propane. The epoxy equivalent weight of the epoxy resin(s) is preferably 87–6000, more particularly 120–1000.

The amino compound which may be used as curing agent for the epoxy resin is generally a compound containing at least 1 and preferably at least 2 primary or secondary amino groups per molecule. The compounds may be low molecular weight compounds or high molecular weight compounds. Optionally, use may be made of mixtures of amino compounds.

Examples of suitable low molecular weight amino compounds include monoamines, such as 2-aminoethyl mercaptan, diamines, such as ethylene diamine, isophoron diamine and/or xylylene diamine, and polyamines such as diethylene triamine, dipropylene triamine and/or triethylene tetramine, and mixtures of such polyamino compounds.

Examples of suitable high molecular weight polyamino compounds include polyamidoamino resins: addition products of primary amines to compounds having 2 or more epoxy groups: polymers of amino (meth)acrylates with primary or secondary amino groups, and amino groups-containing polymers of ethylenically unsaturated compounds with primary or secondary amino groups. These high molecular weight polyamino compounds generally have an amino equivalent weight of 70–475, preferably of 95–240.

As examples of representative polyamidoamino resins may be mentioned the resins that may be obtained by polycondensation of one or more di- or polyvalent polyamines, such as ethylene diamine, diethylene triamine or triethylene tetramine, with one or more dicarboxylic acids, for instance: adipic acid, azelaic acid and a dimerized fatty acid, such as dimerized tall oil fatty acid or dimerized soy bean oil fatty acid. The polycondensation may optionally be carried out in the additional presence of a monocarboxylic acid.

Examples of suitable curing agents are also the addition products of an amine with at least a primary or secondary amino group, such as ethanol amine, butyl amine, diethyl amine, ethylene diamine, diethylene triamine and a polyamido amine to a compound having 2 or more epoxy groups. Suitable starting epoxy compounds are, for example, the above-described epoxy resins.

Further examples of suitable curing agents include the homo- or copolymers of amino (meth)acrylates such as aminoethyl (meth)acrylate, aminobutyl (meth)acrylate, methyl aminoethyl (meth)acrylate and/or hydroxyethyl aminoethyl (meth)acrylate, and optionally of one or more copolymerizable ethylenically unsaturated compounds, such as methyl (meth)acrylate, ethyl (meth)acrylate, butyl (meth)acrylate, 2-ethylhexyl (meth)acrylate, (meth)acrylonitrile, 2-hydroxyethyl (meth)acrylate, glycidyl (meth)acrylate, styrene, α-methyl styrene, vinyl toluene, vinyl acetate, vinyl chloride and/or vinyl isobutyl ether. Examples of other suitable curing agents include ketimines of the afore-described primary and/or secondary amines with ketones, such as methylethyl, ketone, diethyl ketone, methylisobutyl ketone or methylamyl ketone.

The afore-described curing agents are generally known and need not to be further described here (see, for instance, Lee and Neville, Handbook of Epoxy Resins, McGraw Hill, New York).

In the composition the ratio of the number of active hydrogen atoms of the amino compound to the number of epoxy groups of the epoxy resin is 0,4–1,5 and preferably 0,6–1,2; more particularly the amino compound is present in an amount such that the molar ratio of reactive amino groups to epoxy groups is 0,95–1,05.

According to the invention the water-reducible composition also contains a formic acid ester having a solubility of at least 0,2 g in 100 g of water of a temperature of 20° C. with the exception of tert. butyl formate. It is preferred that the ester should be an ester of romic acid and a monovalent alcohol containing 1–6, more particularly 1–5 carbon atoms. Examples of suitable alcohols include methanol, ethanol, n-propanol, isopropanol, n-butanol, isobutanol, n-pentanol, isopentanol and ether alcohols such as 2-ethoxy ethanol, 2-propoxy ethanol and 2-butoxy ethanol. More particularly, the ester is a formic ester of the general formula

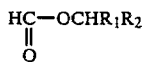

wherein $R_1$ and $R_2$ may be the same or different and represent a hydrogen atom or an alkyl group, with the groups $R_1$ and $R_2$ together containing not more than 5 carbon atoms. A particularly preferred ester is methyl formate, ethyl formate or isopropyl formate. Other suitable esters are the esters of formic acid and a bi- or polyvalent hydroxy compound having 2–8 carbon atoms. As examples of suitable hydroxy compounds may be mentioned ethylene glycol, propylene glycol, glycerol, trimethylol propane and pentaerythritol. The formic acid may optionally contain one or more hydroxyl groups.

It is preferred that the formic acid ester should have a solubility of 0,2–50 g, more particularly of 0,5–35 g in 100 g of water at a temperature of 20° C.

The formic acid ester is generally present in an amount such that 0,4–2 equivalents of formate are present per equivalent of nitrogen of the amino group-containing curing agent.

The water-reducible coating composition can be formed in any suitable manner from the epoxy resin, the amino compound and the formic acid ester. It is preferred that the epoxy resin should be mixed with the formic acid ester and one or more organic solvents and subsequently be mixed with a solution of the curing agent in an organic solvent. In practice the formic acid ester is added to the epoxy resin or to the solution containing the epoxy resin and the curing agent. To obtain the desired application viscosity water may finally be added to the ultimately obtained solution. The water-reducible composition may contain the usual additives, such as pigments, fillers, levelling agents, anti-foam agents, sag control agents, corrosion inhibiting agents, catalysts for curing the epoxy compound, and inert organic solvents, such as aliphatic or aromatic hydrocarbons, and solvents such as glycol ethers, e.g. butyl glycol or propylene glycol monomethyl ether, and esters thereof.

The coating composition ready for use may generally contain at least 30% by weight of water, preferably at least 40% by weight of water.

The coating composition may be applied to the substrate in any desirable manner, for instance by roller coating, spraying, brushing, sprinkling, flow coating or dipping. It is preferred that the coating composition should be applied by spraying or dipping.

The substrate may be of a metal, such as aluminium, magnesium, steel, iron, titanium, or of a synthetic material such as an epoxy resin, polyether-ether ketone, polyimide or polyester reinforced or not with fibres. The substrate may optionally be pre-treated. The coating composition is preferably applied as primer in the aircraft industry. The coating composition is generally cured at ambient temperature or at a somewhat elevated temperature of, for instance, up to 80° C. The thickness (after curing) of the coating is generally 5–25 μm, preferably 10–20 μm.

The invention also relates to a mixture of an epoxy resin and a formic acid ester having a solubility of at least 0,2 g in 100 g of water of a temperature of 20° C., with the exception of tert. butyl formiate. The invention also relates to a process of coating a substrate with the present aqueous coating composition.

The invention will be further described in the following unlimitative examples. As epoxy resin A is used therein a diglycidyl ether of bis-(4-hydroxyphenyl)-2,2-propane having an epoxy equivalent weight of 230–280 (available under the trade mark Epikote 834 of Shell Chemical). As epoxy resin B there is used a polyglycidyl ether of a phenol-formaldehyde novolac having an epoxy equivalent weight of 172–179 (available under the trade mark Den 431 of Dow Chemical). As curing agent A for the epoxy resin there is used an addition product of 36,36 parts by weight of a polyamidoamino resin having an amine equivalent weight of 150 (available under the trade mark Versamid 140 of Schering) to 11,42 parts by weight of the aforementioned epoxy resin Epikote 834. As curing agent B for the epoxy resin there is used an addition product of 36,36 parts by weight of the aforementioned polyamidoamino resin Versamid 140 to 8,70 parts by weight of a diglycidyl ether of bis-(4-hydroxyphenyl)methane having an epoxy equivalent weight of 187 (available under the trade mark Epikote DX 235 of Shell Chemical). Use is also made of a pigment mixture of 47,68 parts by weight of barium chromate, 31,71 parts by weight of rutile titanium dioxide and 30,21 parts by weight of aluminum silicate. All parts and percentages referred to are by weight. The amounts of ester and aromatic hydrocarbon given in the Table are in parts by weight.

EXAMPLE 1

To 103,57 parts of a solution of 47,78 parts of curing agent A in 18,58 parts of butyl glycol and 40,42 parts of an aromatic hydrocarbon (available under the trade mark Solvesso 100 of Esso) there were homogeneously added 109,60 parts of the pigment mixture. The resulting product was homogeneously mixed with a solution of 9 parts of ethyl formate in 47,78 parts of epoxy resin A. Finally, 3 portions each of 100 g of demineralized water were added to the resulting mixture with stirring and it was found that a phase reversal of water in oil to oil in water had occurred after the second portion of water had been added.

EXAMPLE 2

Example 1 was repeated, with the exception that instead of 47,78 parts of epoxy resin A 34,10 parts of epoxy resin B were used.

EXAMPLE 3

Example 1 was repeated, with the exception that instead of 47,78 parts of curing agent A 45,06 parts of curing agent B, and instead of 9,0 parts of ethyl formiate, 7,3 parts of methyl formiate were used and the aromatic hydrocarbon was employed in an amount of 42,12 parts.

EXAMPLES 4-8

Example 1 was repeated, with the exception that instead of the 9,0 parts of ethyl formate there were used the esters mentioned in the Table in the amounts given therein and the aromatic hydrocarbon also in the amounts given in the Table.

TABLE

| Examples | Ester Compound | Amount | Amount of aromatic hydrocarbon |
|---|---|---|---|
| 4 | isopropyl formate | 10,7 | 38,72 |
| 5 | butyl formate | 12,4 | 37,02 |
| 6 | isopentyl formate | 14,2 | 35,22 |
| 7 | ethylene glycol diformate | 7,2 | 42,22 |
| 8 | 2-butoxyethyl formate | 17,8 | 21,62 |

TESTING AQUEOUS COMPOSITIONS

To an aluminium panel pre-treated in accordance with standard MIL-C-5541 each of the aqueous compositions was applied that had been obtained in the Examples 1-8. The compositions were sprayed onto the panel to a thickness of 16 μm (after drying) and were kept at a temperature of 21° C. for 180 minutes. Except for the case where the adhesion of the primer to the aluminium had to be measured, a polyurethane coating was sprayed onto the primer to a thickness of 30 μm (after drying), the composition and the properties of the polyurethane coating conforming to standard MIL-C-83286.

All eight aqueous compositions are in full conformity with the MIL-P-85582 standards set by the Department of Defense of the United States of America for use as aqueous primer for aircraft. These standards imply, int.al., that in an adhesion test of the primer carried out in accordance with ASTM-D-2197 there shall be no loss of adhesion; in the salt spray test for 1000 hours in accordance with ASTM-B-117 there shall be no formation of corrosion at a distance further than 0,5 mm from the scratch; nor shall there occur any corrosion at a distance further than 3,2 mm from the scratch in the filiform test for 500 hours in accordance with ASTM-D-2803; measured in conformity with U.S. Federal Standard 141, method 6226, the ductility of the coating shall be more than 60% (back of panel); in the measurement of the so-called wet adhesion in accordance with US Federal Standard 141, method 6301, there shall be no loss of adhesion; there shall be excellent resistance to water after 4 days' immersion of the panel in water of 50° C.; upon exposure to 3 different oils in accordance with MIL-L-23699, MIL-H-5605 and MIL-H-83282 for 24 hours at 121° C., 66° C. and 66° C., respectively, there shall be no loss of adhesion, no formation of blisters and no softening.

What is claimed is:

1. A water reducible coating composition comprising (a) an epoxy resin, (b) an amino group containing curing agent for the epoxy resin, and (c) a formic acid ester other than tert. butyl formate having a solubility of at least 0,2 g in 100 g of a temperature of 20° C.

2. The coating compositon of claim 1, wherein the ester is an ester of formic acid and a monovalent alcohol having 1-6 carbon atoms.

3. The coating composition of claim 2, wherein the ester is an ester of formic acid and a monovalent alcohol having 1-5 carbon atoms.

4. The coating compositon of claim 1, wherein the ester is a formic acid ester of the general formula

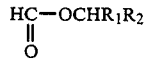

wherein $R_1$ and $R_2$ may be the same or different and represent a hydrogen atom or an alkyl group, with the groups $R_1$ and $R_2$ together containing not more than 5 carbon atoms.

5. The coating composition of claim 1, wherein the ester is methyl formate, ethyl formate, or isopropyl formate.

6. The coating composition of claim 1, wherein the ester is an ester of formic acid and a di- or polyvalent hydroxy compound having 2-8 carbon atoms.

7. The coating composition of claim 1, wherein the ester has a solubility of 0,2-50 g in 100 g of water of a temperature of 20° C.

8. The coating composition of claim 7, wherein the ester has a solubility of 0,5-35 g in 100 g water of a temperature of 20° C.

9. The coating composition of claim 1, wherein the ester is present in an amount such that 0,4-2 equivalents of formate are present per equivalent of nitrogen of the amino group-containing curing agent.

10. A mixture of (a) an epoxy resin and (b) a formic acid ester other than tert. butyl formate having a solubility of at least 0,2 g in 100 g of water of a temperature of 20° C.

11. The mixture of claim 10, also containing an organic solvent for the epoxy resin.

* * * * *